United States Patent [19]
Song et al.

[11] Patent Number: 6,156,693
[45] Date of Patent: Dec. 5, 2000

[54] METHOD FOR PREPARING A HIGHLY ACTIVE, UNSUPPORTED HIGH-SURFACE-AREA $MoS_2$ CATALYST

[75] Inventors: Chunshan Song, State College, Pa.; Yoshiharu Yoneyama, Uozu, Japan; Madhusudan Reddy Kondam, State College, Pa.

[73] Assignee: Penn State Research Foundation, University Park, Pa.

[21] Appl. No.: 09/413,121

[22] Filed: Oct. 6, 1999

Related U.S. Application Data

[60] Provisional application No. 60/103,606, Oct. 9, 1998.
[51] Int. Cl.[7] .............................. B01J 27/05; C01B 17/00
[52] U.S. Cl. .................... 502/220; 502/219; 423/511; 423/561.1; 423/562
[58] Field of Search .................... 502/219, 220; 423/511, 561.1, 562

[56] References Cited

U.S. PATENT DOCUMENTS

| | | | |
|---|---|---|---|
| 4,528,401 | 7/1985 | Yeh et al. | 568/408 |
| 4,557,821 | 12/1985 | Lopez et al. | 208/108 |
| 4,675,344 | 6/1987 | Conway et al. | 518/714 |
| 4,825,013 | 4/1989 | Quarderer et al. | 568/902.2 |
| 4,886,772 | 12/1989 | Prada-Silva et al. | 502/200 |
| 4,994,498 | 2/1991 | Kinkade | 518/714 |

*Primary Examiner*—Elizabeth D. Wood
*Attorney, Agent, or Firm*—Thomas J. Monahan

[57] ABSTRACT

The present invention is a new and simple method of decomposing ammonium tetrathiomolybdate (ATTM) in an organic solvent with added water under $H_2$ pressure. Model compound reactions of 4-(1-naphthylmethyl)bibenzyl (NMBB) were carried out at 350–425° C. under $H_2$ pressure in order to examine the activity of the Mo sulfide catalysts generated from ATTM with and without added water for C—C bond cleavage and hydrogenation of aromatic ring. The Mo sulfide catalysts generated from ATTM with added water were much more effective for C—C bond cleavage and hydrogenation of aromatic moieties at 350–425° C. than those from ATTM alone. Two-step tests revealed that the addition of water is effective for generating highly active Mo sulfide catalyst from ATTM, but water itself does not promote catalytic conversion. Removal of water after the decomposition of ATTM with added water at 350–400° C. under $H_2$ pressure by hot purging gives highly active Mo sulfide catalyst.

9 Claims, 14 Drawing Sheets

BET Surface Area of the Catalysts Prepared from ATTM at 350–400° C

| Catalyst Precursor | ATTM | ATTM + $H_2O$ |
|---|---|---|
| Prep. Temperature(°C)[a] | Surface Area ($m^2/g$) | Surface Area ($m^2/g$) |
| 350[b] | 54 | 335 |
| 375[b] | 70 | 342 |
| 400[b] | 59 | 286 | a) Catalysts were prepared by ATTM (0.083g) in the absence or presence of $H_2O$ (1.6g) in n-C13 (7g) under 6.9 MPa $H_2$ for 30 min.   b) Samples were vacuum-dried and then stored for several days (before BET) in closed Pyrex vial after exposure to air.

Surface Area and Pore Volume of Fresh Catalysts Prepared from ATTM at 375°C

| MoSx sample | Pore Vol (cc/g) | Tot. Surf. area (m2/g) | Micro-pore area (m2/g) | Meso-pore area (m2/g) |
|---|---|---|---|---|
| Preparation Conditions | | | | |
| ATTM+H$_2$O under H$_2$ at 375°C[a] | 0.625 | 429 | 192 | 237 |
| ATTM under H$_2$ at 375°C[a] | 0.261 | 91 | 56 | 35 |
| MoS$_2$ from Aldrich[b] | 0.056 | 11 | 0 | 11 | a) A new batch of freshly prepared sample which was stored in n-C13 solvent and vacuum-dried before use for BET. b) The sample was washed with acetone and vacuum-dried.

Noncatalytic hydrogenolysis of NMBB in 1.48 g tridecane under 6.9 MPa hydrogen

Yield (mol%) of product

| Temp. (°C) | Conv. (wt%) | ⌬-CH₃, CH₃-⌬-CH₃ | ⌬⌬ | ⌬⌬-CH₃ | ⌬-CH₃, CH₃-⌬ | ⌬-CH₂-CH₂-⌬, CH₃-⌬-CH₂-CH₂-⌬ | ⌬⌬-CH₂-⌬ | ⌬⌬-CH₂-⌬-CH₃ | ⌬⌬-CH₂-⌬-C₂H₅ | 4H-NMBB |
|---|---|---|---|---|---|---|---|---|---|---|
| 350 | 0 | 0 | 0 | 0 | 0 | 0 | 0 | 0 | 0 | 0 |
| 375 | 0 | 0 | 0 | 0 | 0 | 0 | 0 | 0 | 0 | 0 |
| 400 | 5.9 | 0.4 | 0.9 | 1.5 | 0 | 0 | 0 | 0 | 0 | 0.5 |
| 425 | 16.1 | 1.2 | 3.4 | 1.7 | 0.6 | 0.1 | 1.2 | 0.2 | 0.8 | 1.2 |
| 450 | 67.5 | 9.0 | 16.4 | 0 | 4.8 | 2.2 | 3.0 | 6.0 | 2.3 | 1.0 |

Additional values (425 row continued): 5.2 | ; (450 row): 8.5 | 20.1

Effect of Mo catalyst precursor on hydrogenolysis of NMBB in 1.48 g tridecane under 6.9 MPa hydrogen

| Catalyst Precursor | Temp. (°C) | Conv. (wt%) | ⌬–CH₃ / ⌬(CH₃)₂–CH₃ | ⌬⌬ | ⌬ | ⌬⌬–CH₃ / ⌬⌬(CH₃) | ⌬⌬–CH₃ / ⌬(CH₃) | ⌬–CH₂CH₂–⌬ | 4H–NMBB ⌬(CH₃)–CH₂CH₂–⌬ |
|---|---|---|---|---|---|---|---|---|---|
| ATTM | 350 | 78.9 | 0 | 49.4 | 11.4 | 0.3 | 0.8 | 8.3 | 57.7 | 8.2 |
| ATTM | 375 | 92.4 | 0 | 56.8 | 18.5 | 0.7 | 1.3 | 11.8 | 74.5 | 7.7 |
| ATTM | 400 | 92.9 | 2.2 1.6 | 55.1 | 21.3 | 0.6 | 1.4 | 12.6 | 72.5 | 2.6 |
| ATTM | 425 | 96.3 | 10.6 7.8 | 52.1 | 22.2 | 0.6 | 1.3 | 11.8 | 63.4 | 0.4 |
| ATTM+H₂O | 350 | 99.3 | 0 | 56.1 | 21.1 | 0.4 | 1.6 | 10.3 | 75.6 | 9.1 |
| ATTM+H₂O | 375 | 99.9 | 0 | 60.2 | 25.0 | 0.9 | 1.6 | 13.6 | 82.9 | 4.0 |
| ATTM+H₂O | 400 | 99.7 | 2.3 1.7 | 54.5 | 27.9 | 0.9 | 1.8 | 14.4 | 77.6 | 1.3 |
| ATTM+H₂O | 425 | 100 | 13.5 10.7 | 55.7 | 24.9 | 1.1 | 1.4 | 14.6 | 63.3 | 0 |

Yield (mol%) of product

Effect of Mo catalyst precursor on hydrogenolysis of NMBB in 2.95 g tridecane under 6.9 MPa hydrogen

| Catalyst Precursor | Temp. (°C) | Conv. (wt%) | Yield (mol%) of product | | | | | | |
|---|---|---|---|---|---|---|---|---|---|
| | | | ⬡-$CH_3$ | $CH_3$-⬡-$CH_3$ $CH_3$ | ⬡⬡ | ⬡⬡-$CH_3$ | ⬢⬡-$CH_3$ | ⬡-$CH_2$-$CH_2$-⬡ | 4H-NMBB $CH_3$-⬡-$CH_2$-$CH_2$-⬡ |
| ATTM | 350 | 37.4 | 0 | 0 | 28.7 | 6.4 | 0 | 4.1 | 30.0 | 8.3 |
| ATTM | 375 | 67.6 | 0 | 0 | 43.5 | 11.5 | 0.8 | 8.0 | 51.4 | 5.7 |
| ATTM | 400 | 83.4 | 0 | 0 | 53.0 | 15.1 | 1.0 | 11.3 | 63.3 | 2.4 |
| ATTM+$H_2O$ | 350 | 93.1 | 0 | 0 | 55.4 | 12.6 | 1.0 | 7.9 | 65.8 | 13.5 |
| ATTN+$H_2O$ | 375 | 99.9 | 0 | 0 | 57.6 | 27.9 | 1.8 | 12.6 | 80.9 | 4.7 |
| ATTM+$H_2O$ | 400 | 91.2 | 0 | 0 | 54.7 | 20.4 | 1.3 | 12.4 | 70.8 | 1.7 |

FIG. 11

Comparison of catalytic activity of Mo sulfide in situ generated from ATTM (left) and ATTM+$H_2O$ for NMBB conversion in about 3 g n-tridecane solvent at 350°C.

Conversion of NMBB in two-step tests using ATTM+H₂O as catalyst precursor in the first step.

| Catalyst Precursor | 1st Step Temp. (°C) | 2nd Step Temp. (°C) | Conv. (wt%) | Yield (mol%) of product | | | | | | |
|---|---|---|---|---|---|---|---|---|---|---|
| | | | | ⬡-CH₃ / ⬡⬡-CH₃,CH₃ | ⬡ | ⬡⬡ | ⬡⬡-CH₃ | ⬡⬡-CH₃,CH₃ | ⬡-CH₂-CH₂-⬡ / ⬡-CH₂-CH₂-⬡-CH₃ | 4H-NMBB |
| ATTM+H₂O | 350 | 350 | 99.6 | 0 | 59.8 | 20.0 | 5.9 | 2.2 | 1.6 | 1.1 | 15.8 | 74.6 | 2.7 |
| ATTM+H₂O | 375 | 350 | 100 | 0 | 54.6 | 25.8 | 5.2 | 2.4 | 2.0 | 1.4 | 17.6 | 74.2 | 1.7 |
| ATTM+H₂O | 400 | 350 | 99.0 | 0 | 58.4 | 20.3 | 5.9 | 2.4 | 1.7 | 1.2 | 17.0 | 72.6 | 2.3 |

FIG. 14

METHOD FOR PREPARING A HIGHLY ACTIVE, UNSUPPORTED HIGH-SURFACE-AREA MOS$_2$ CATALYST

This application claims priority to U.S. Provisional Application No. 60/103,606 filed Oct. 9, 1998, which is herein incorporated by reference.

BACKGROUND

Various catalysts have been tested for conversion and upgrading of liquid and solid fuels. Among them molybdenum sulfide-based catalysts are widely used for hydroprocessing and hydrodesulfurization. Mo sulfide can be prepared from molybdate or thiomolybdate. A well-established method for preparing MoS$_2$ catalyst involves decomposition of ammonium tetrathiomolybdate (ATTM) in an inert gas or in H$_2$. The MoS$_2$ catalyst generated from decomposition of ATTM is more active than that from sulfidation of molybdenum oxide or the reagent MoS$_2$, and thus ATTM has been used as catalyst precursor for generation of active MoS$_2$. The surface area values for thus-prepared MoS$_2$ catalysts are relatively low, usually somewhere between 6–70 m$^2$/g. It is desirable to have a MoS$_2$ catalysts with higher surface area values than currently available. It is also desirable to have a MoS$_2$ catalysts t hat is more active than currently available.

SUMMARY OF THE INVENTION

The present invention is a new and simple method of decomposing ammonium tetrathiomolybdate (ATTM) in an organic solvent with added water under H$_2$ pressure. Model compound reactions of 4-(1-naphthylmethyl)bibenzyl (NMBB) were carried out at 350–425° C. under H$_2$ pressure in order to examine the activity of the Mo sulfide catalysts generated from ATTM with and without added water for C—C bond cleavage and hydrogenation of aromatic ring. The Mo sulfide catalysts generated from ATTM with added water were much more effective for C—C bond cleavage and hydrogenation of aromatic moieties at 350–425° C. than those from ATTM alone. Two-step tests revealed that the addition of water is effective for generating highly active Mo sulfide catalyst from ATTM, but water itself does not promote catalytic conversion. Removal of water after the decomposition of ATTM with added water at 350–400° C. under H$_2$ pressure by hot purging gives highly active Mo sulfide catalyst.

DETAILED DESCRIPTION

The present invention provides a new and simple method to prepare a high-surface-area unsupported MoS$_2$ type catalysts by decomposing ATTM in an organic solvent in the presence of added water under hydrogen pressure.

The dispersed (unsupported) MoS catalyst particles are prepared by decomposing ATTM in normal tridecane solvent in the presence of added water under hydrogen pressure at 350, 375 and 400° C. in a micro autoclave. Characterization of the catalysts were performed using various techniques, including BET (first conducted on Micromeritics Gemini 2375, later on Quantachrome Autosorb-1), SEM (conducted on Philips XL-20), XRD (Philips Automated Powder Diffractomer, Cu Koc), XPS (Mg Koc. 14 keV at 20 mA, on Kratos Analytical XSAM800 PCI), TPO (on Mettler TG50 from r.t. to 600° C. in an air flow).

Figure 1:
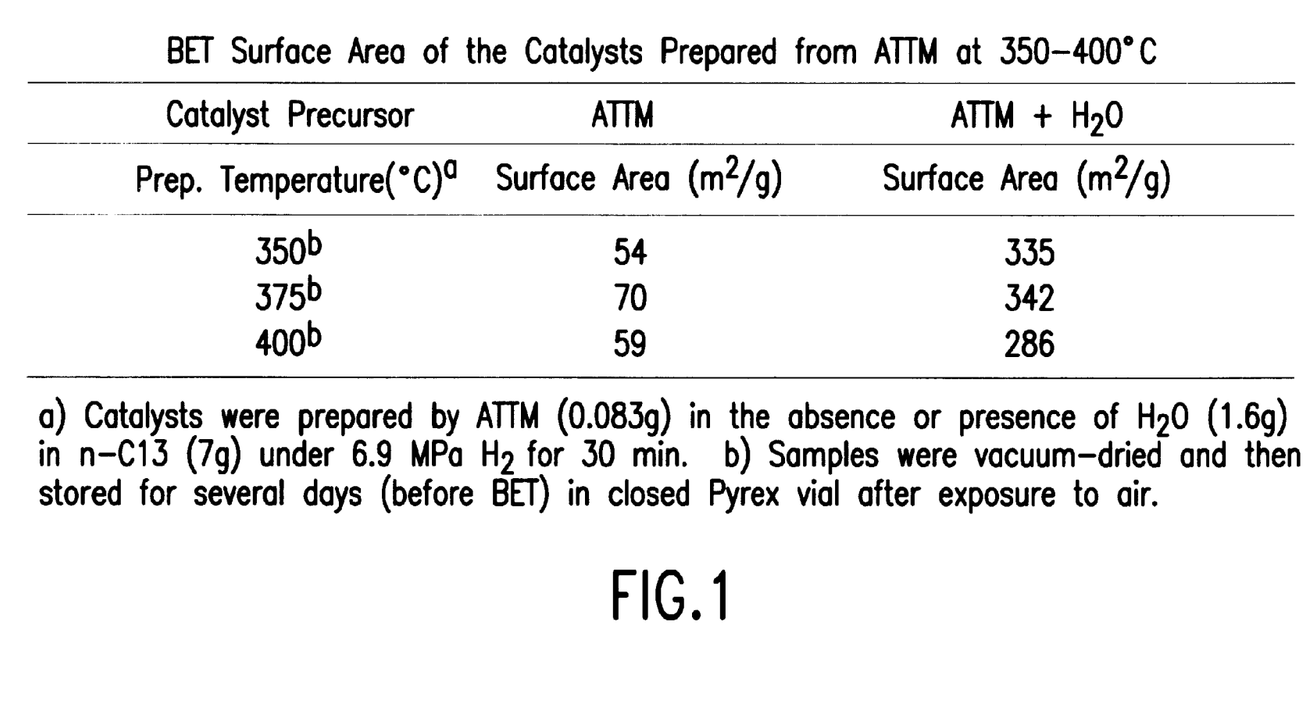
FIG. 1 is a table of the results from a BET Surface Area of the catalysts prepared from ATTM at 350–400° C.

The BET analysis is shown in FIG. 1, which indicates that the Mo sulfide samples produced from ATTM+H$_2$O at 350–400° C. have much higher surface area (286–335 m$^2$/g) than those (54–70 m$^2$/g from ATTM alone (the word "alone" here means without the addition of water). For example, the surface area of the Mo sulfide prepared at 375° C. from ATTM+H$_2$O is 342 m$^2$/g, which is about times that of the sample from ATTM without water (70 m$^2$/g).

Figure 2:
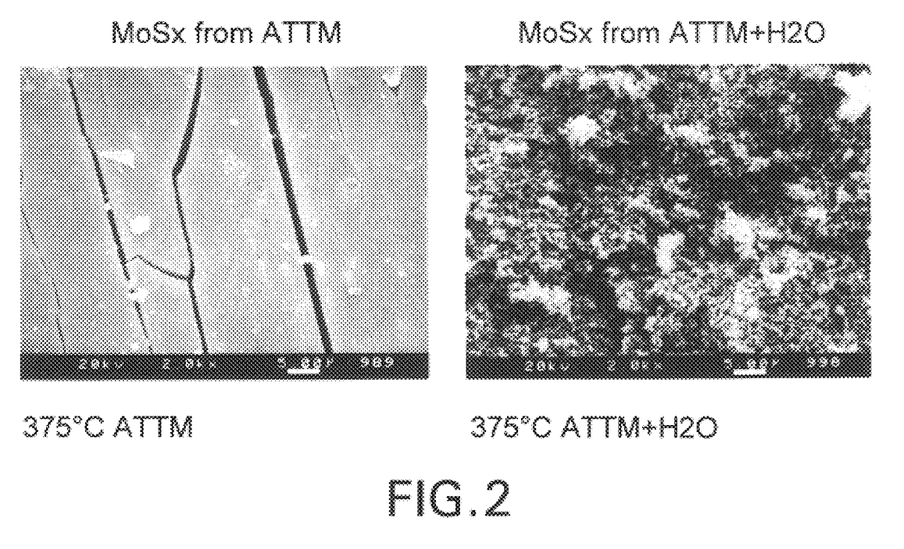
FIG. 2 is a SEM of Mo sulfide prepared at 375° C. from ATTM alone (left) and from ATTM with added water (right) at 375° C.

SEM photos of the Mo sulfide samples prepared at 375° C. are shown in FIG. 2. It is clear from SEM examination that the samples produced from ATTM+H$_2$O at 350–400° C. are much more porous and their surfaces are rough. On the other hand, Mo sulfides from ATTM alone at 350–400° C. they have a crystalline morphology, and have flat and smooth surface with visible cracks.

Figure 3A:
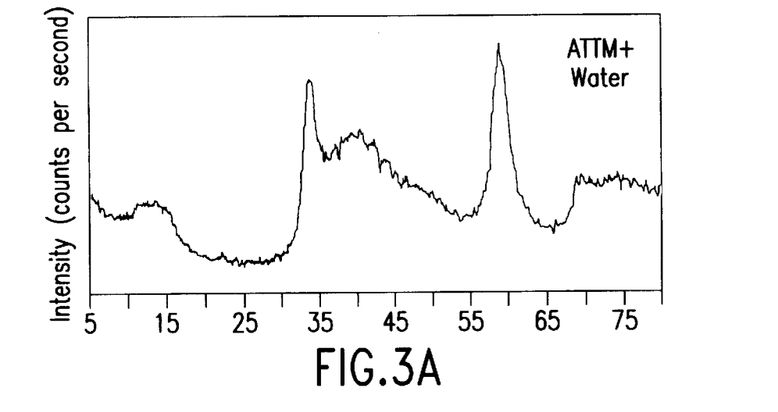
FIG. 3 is a XRD of Mo sulfide prepared at 375° C. from ATTM+H$_2$O (top), ATTM alone (middle) and Aldrich MoS2 reagent (bottom)
Figure 3B:
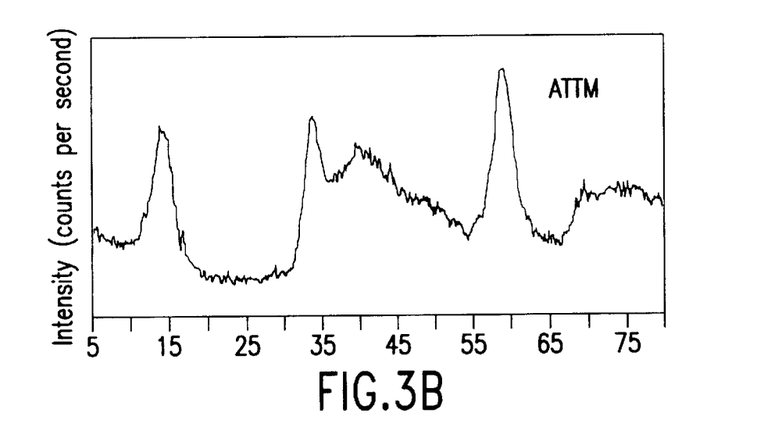
Figure 3C:
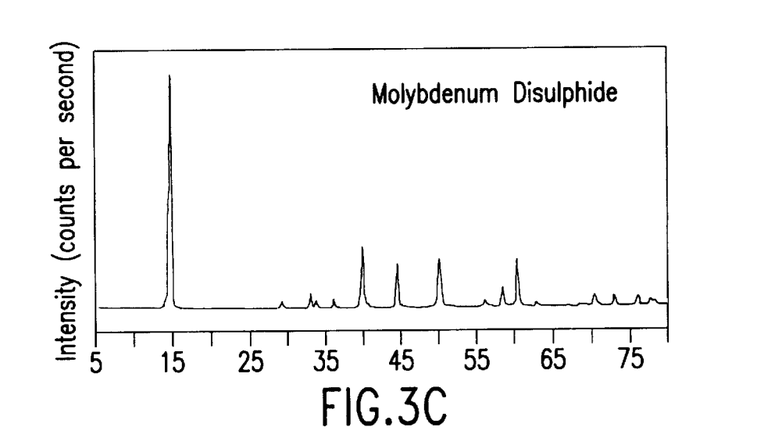

XRD profiles in FIG. 3 indicate that compared to reagent MoS$_2$, the MoS$_2$ from ATTM are poorly crystalline. The XRD patterns of the MoS$_2$ from ATTM at 350–400° C. are very similar to those reported in the industry for MoS$_2$. From comparative examination, it becomes clear that the samples prepared from ATTM alone and those from ATTM+H$_2$O have similar XRD patterns in general, suggesting that the sample from ATTM+H$_2$O is MoS$_2$ like material. However, the 002 peak of the latter (from ATTM+H$_2$O) is broader and has a much lower intensity. This trend was observed for all the samples prepared at 350° C., 375° C. and 400° C. The very weak 002 peak suggests that the degree of MoS$_2$ layer stacking is much smaller in the samples prepared from ATTM+H$_2$O than in the samples from ATTM alone. On the other hand, it is known that XRD is not sensitive to surface species, and it can not detect the extremely small particles below <30 A. Therefore, we also examined the surface of the Mo sulfide catalysts by X-ray photoelectroscopy (XPS).

Figure 4:
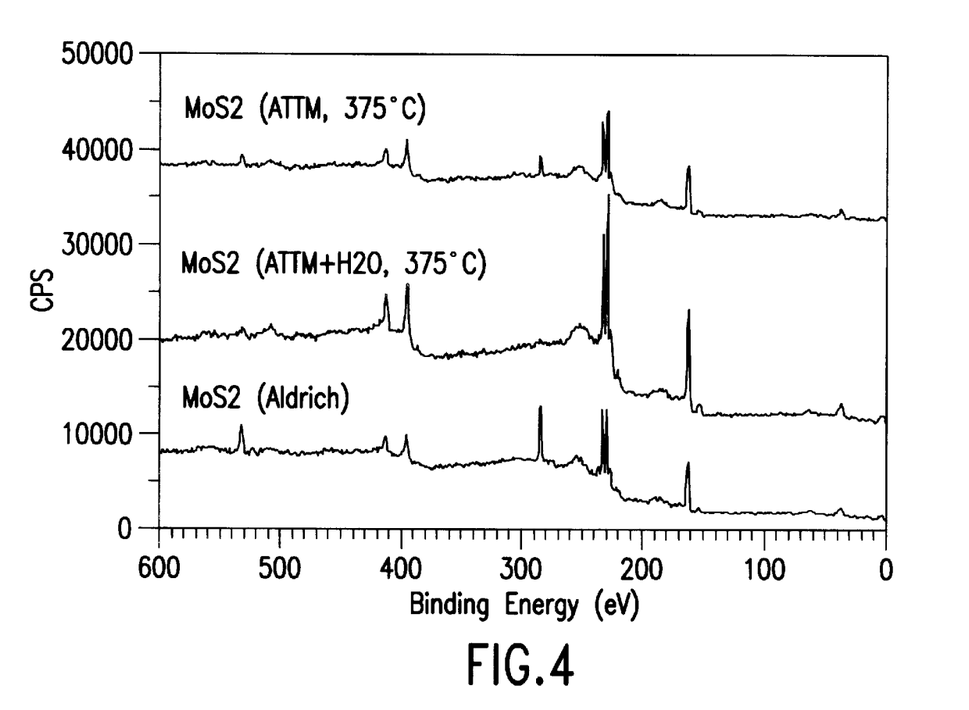
FIG. 4 is a XPS survey spectra of Mo sulfide prepared at 375° C. from ATTM alone (top), ATTM+H$_2$O(middle) and Aldrich MoS2 reagent (bottom)
Figure 5:
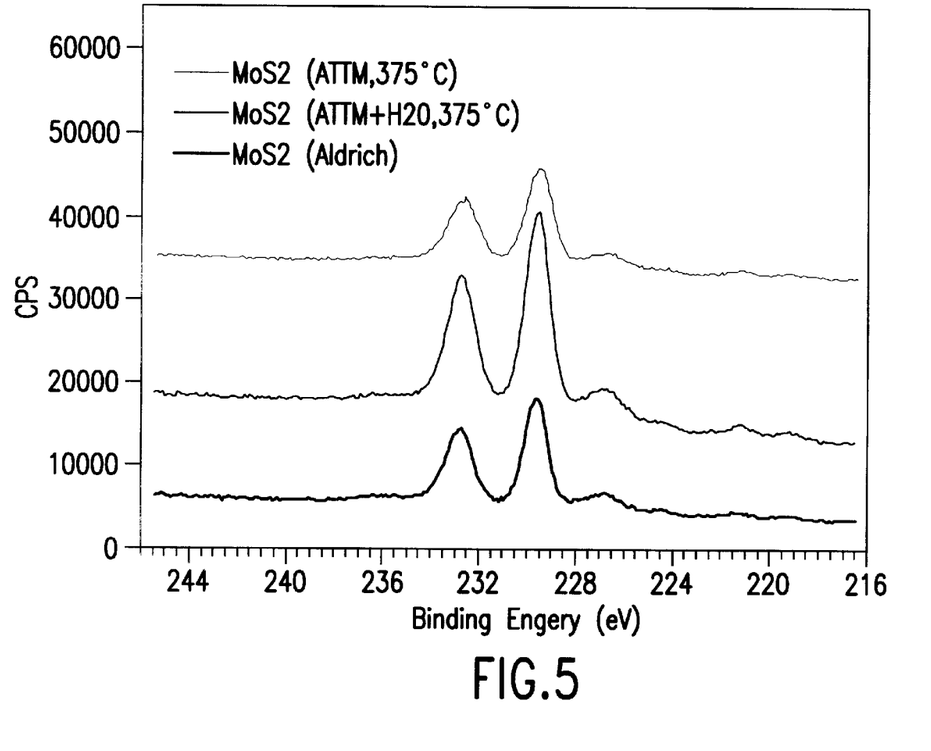
FIG. 5 is a XPS Mo 3d spectra of Mo sulfide prepared at 375° C. from ATTM alone (top), ATTM+H$_2$O(middle) and Aldrich MoS, reagent (bottom)
Figure 6:
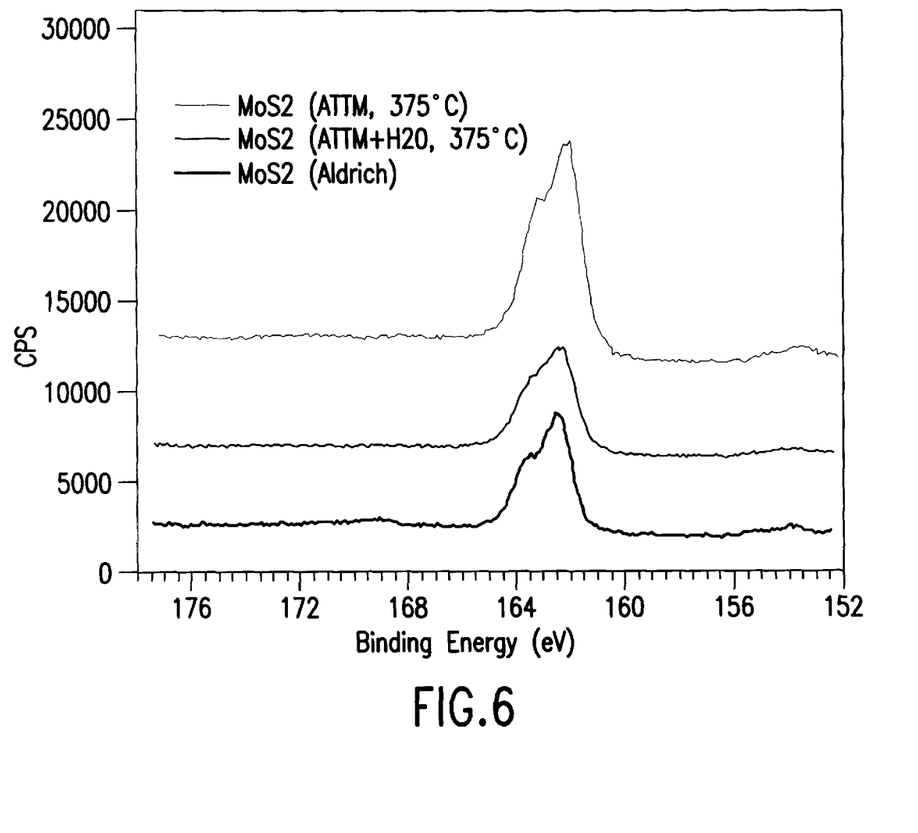
FIG. 6 is a XPS S 2p spectra of Mo sulfide prepared at 375° C. from ATTM alone (top), ATTM+H$_2$O(middle) and Aldrich MoS. reagent (bottom)

The XPS spectra of the samples were measured in two modes: a survey scan for examining the overall composition (FIG. 4), and high resolution scans for the Mo$_{3d}$ (FIG. 5), S$_{2p}$ (FIG. 6), S$_{2s}$, C$_{1s}$ and O$_{1s}$ peaks. The survey spectra (FIG. 4) show that they are similar materials consisting of Mo and S. However, the commercial reagent MoS$_2$ from Aldrich and the sample from ATTM alone also show the C$_{1s}$ peak at 284.6 eV. The MoS$_2$ reagent contains significantly more carbon than all the other samples. We also conducted an acetane washing and vacuum-drying of Aldrich MoS reagent followed by its XPS analysis; since the samples from ATTM with or without added water were washed with acetone. The acetone washing reduced the C$_{1s}$ peak intensity for MoS$_2$ reagent but it is still much higher than that of MoS$_2$ from ATTM alone. However, the C$_{1s}$ peak of the sample from ATTM+H$_2$O is very small and close to baseline/noise level. It is also interesting to note that O$_{1s}$ peak can also be seen around 530 eV from the spectra for Aldrich MoS$_2$ reagent and that from ATTM, but the O$_{1s}$ peak for the sample from ATTM+H$_2$O is the smallest among the 3 types of samples, despite the use of water during sample preparation.

Figure 7:
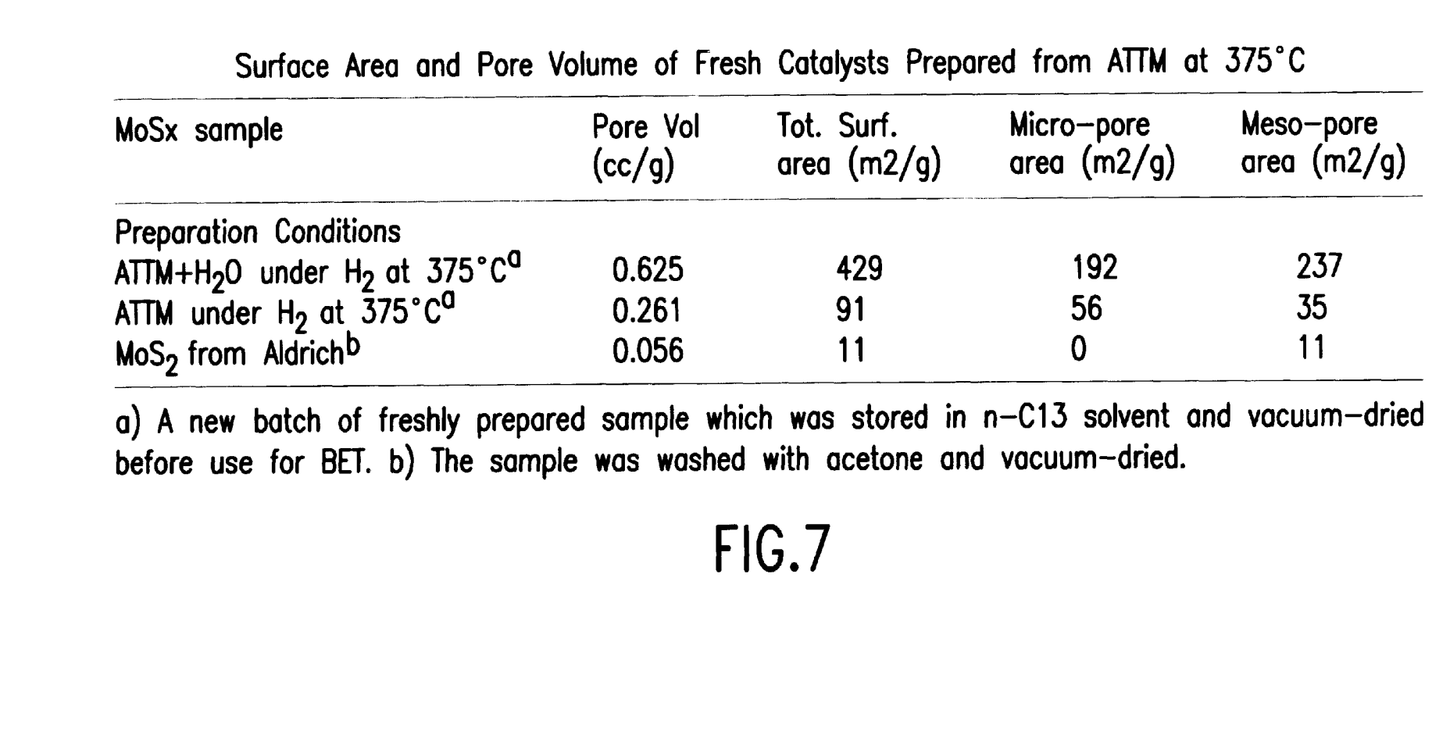
FIG. 7 is a table of the results surface area and pore volume of fresh catalysts prepared from ATTM at 375° C.

Temperature-programmed oxidation (TPO) of the samples in an air flow (conducted using TGA) revealed that the Mo sulfide from ATTM+H$_2$O can be oxidized at lower temperature and at faster speed. In doing repeated sample analysis, we also observed that once exposed to air, the Mo sulfide samples can lose its surface area partially after storage for weeks, and for these samples the peak for TPO shifts to a higher temperature. This change was more pronounced with the sample prepared from ATTM+H$_2$O. Subsequently, we stored the catalyst samples in n-tridecane solvent and only dried it immediately before use. The surface area value for such freshly prepared catalyst from ATTM+H$_2$O at 375° C. (as shown in FIG. 7) is considerably higher than that shown in FIG. 1, which was measured after the sample was exposed to air and stored in the closed Pyrex vial for several days.

Figure 8:
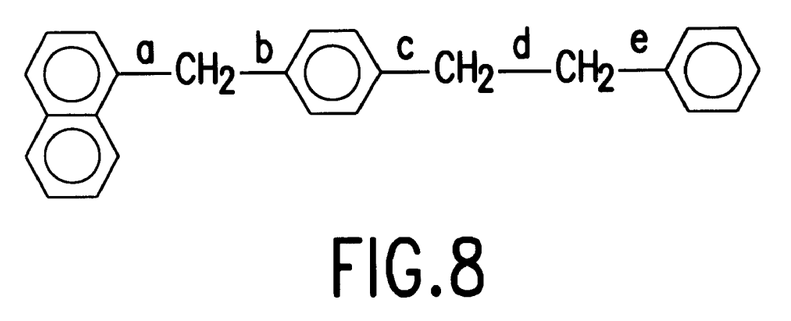
FIG. 8 is a structure of 4-(1-naphthylmethyl)bibenzyl (NMBB) and its potential cleavage sites.

4(1-naphthylmethyl)bibenzyl, abbreviated as NMBB has been used as a model compound for examining activity and selectivity of various catalysts, since there are different types of potential cleavage sites of C—C bonds and both monocyclic and bicyclic aromatic moieties in the compound, as illustrated in FIG. 8. Model compound reactions of NMBB were carried out at 350–425° C. under H$_2$ pressure in order to examine the activity of the Mo sulfide catalysts generated from ATTM with and without added water for C—C bond cleavage and hydrogenation of aromatic ring. ATTM and n-tridecane solvent were purchased from Aldrich, and NMBB was purchased from TCI America. ATTM and NMBB were used without further purification. In this work, a bottle of newly purchased ATTM was used in all experiments on NMBB runs, and the reagent bottle was stored in a refrigerator in order to minimize oxidative degradation.

Testing to compare preparation of the Mo sulfide catalysts generated from ATTM with and without added water were done with a one-step test and a two-step test. For both tests a horizontal tubing microautoclave reactor with a capacity of 25 mL was loaded with ca. 0.8 mmol (0.258 g) of NMBB, 1 wt % catalyst precursor ATTM (1 wt % Mo based on NMBB) and 1.47 g or 2.95 g of solvent (n-tridecane). ATTM was added to the reactor in its powder form (as in the fresh reagent vial from Aldrich). When water was added, the weight ratio of H$_2$O to NMBB was kept at 0.56. The amount of water and the amount of NMBB were determined based on prior work in catalytic coal conversion and model compound studies using NMBB. The sealed reactor was purged four times with H$_2$ and then pressurized with 6.9 MPa H$_2$ at room temperature for all experiments. A preheated fluidized sand bath was used as the heating source, and the reactor was vertically agitated to provide mixing (about 240 strokes/min). After the reaction, the microautoclave was quenched in a cold water bath. The contents were washed out with 20–30 mL acetone, and filtered through a low speed filter paper for subsequent GC analysis of the filtrate. In addition for the two-step test, the active Mo sulfide catalyst was prepared using ATTM in the presence of n-tridecane solvent with added H$_2$O under H$_2$ pressure without NMBB in the 25-mL microautoclave. Then the water vapor and H$_2$S and NH$_3$ gases generated from ATTM decomposition were removed from the reactor by hot venting at 200° C. for 35 min. Subsequently the reactor was opened and NMBB was added into the reactor and then the reaction was conducted at 350° C. in a similar manner as described above.

The products from both tests were identified by GC-MS using a Hewlet-Packard 5890 II GC coupled with a HP 5971 A mass-selective detector operating at electron impact mode (EI, 70 eV). The column used for GC-MS was a J&W DB-17 column; 30-m×0.25-mm, coated with 50% phenyl-50% methylpolysiloxane with a coating film thickness of 0.25 mm. For quantification, a Perkin Elmer 8500 GC flame ionization detector and the same type of DB-17 column were used. Both GC and GC-MS were programmed from 40 to 280° C. at a heating ratio of 6° C./min, with a initial holding time of 5 min and a final holding time of 18 min. The GC response factors for NMBB and 7 of the products were determined using pure compounds. The NMBB conversion is defined as {[NMBB (wt) charged −NMBB (wt) recovered]/NMBB (wt) charged]}×100, and the molar yields of products are defined as [product (mol)/NMBB (mol) charged]×100. Since the products mainly include the compounds from both C—C bond cleavage and partial hydrogenation of NMBB, the sums of product yields are generally less than twice the value of the conversion.

Figure 9:
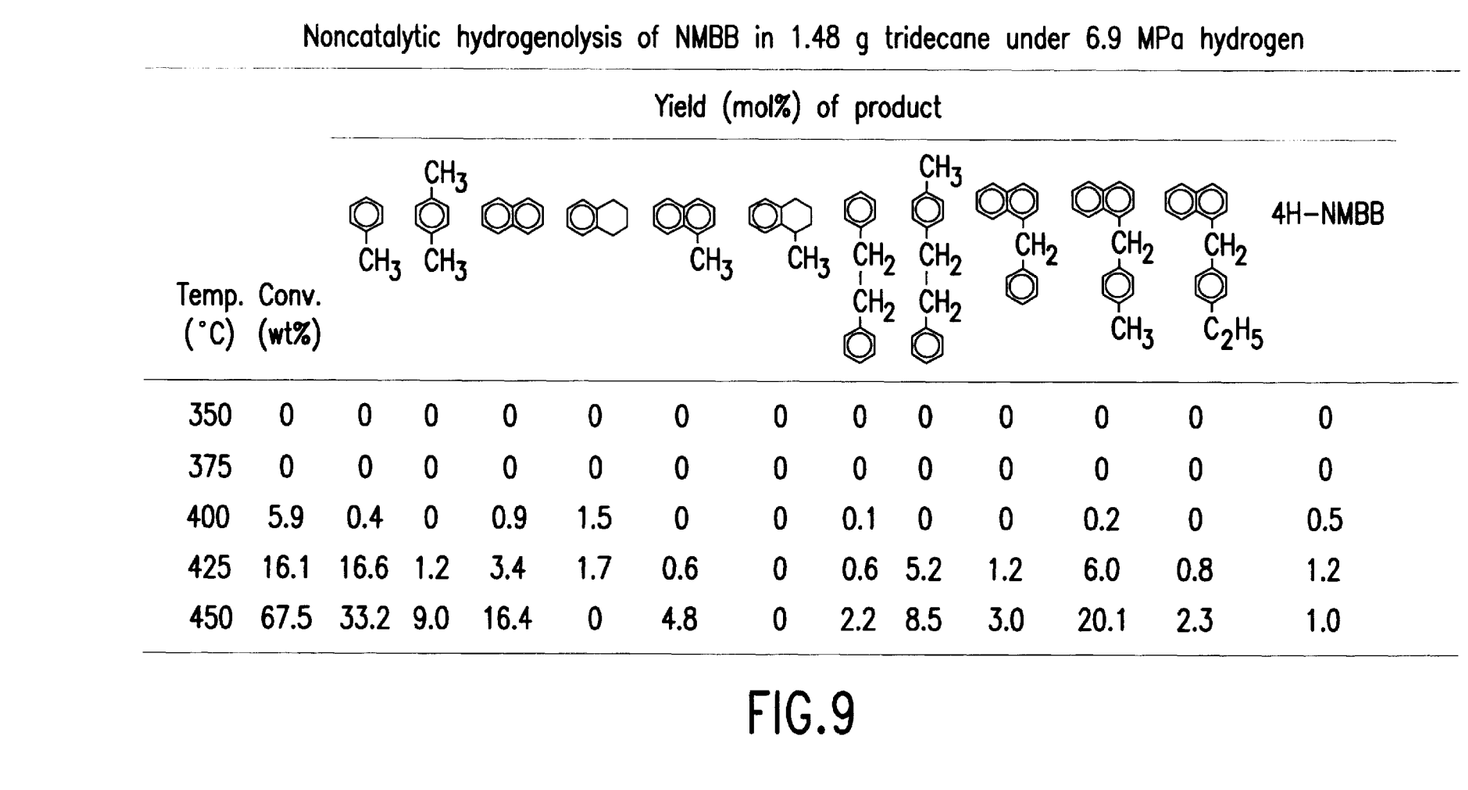
FIG. 9 is a table of the results of noncatalytic hydrogenolysis of NMBB in 1.48 g tridecane under 6.9 MPa hydrogen.
Figure 10:
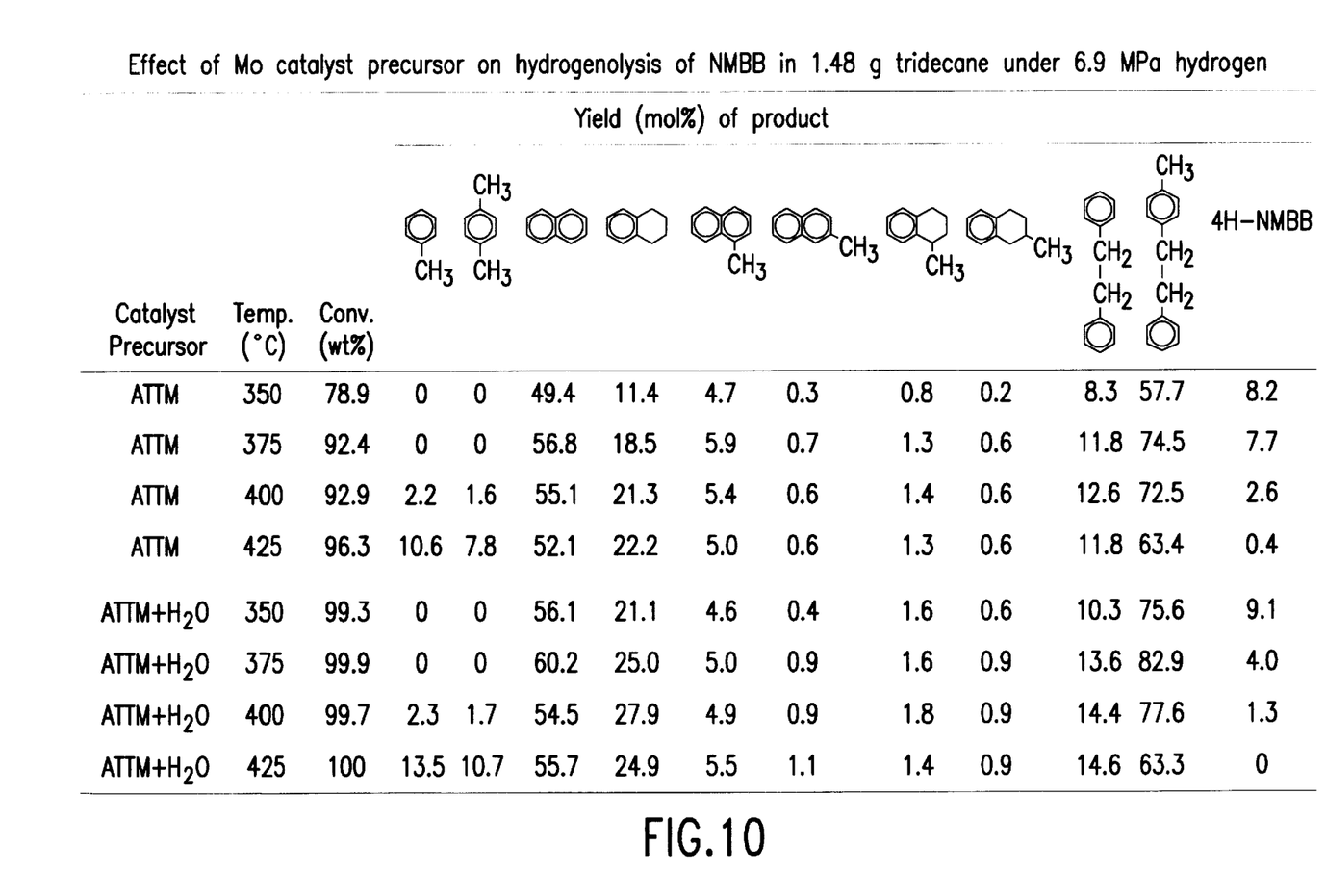
FIG. 10 is a table of the results of effect of Mo catalyst precursor on hydrogenolysis of NMBB in 1.48 g tridecane under 6.9 MPa hydrogen.

FIGS. 9 and 10 show the results of noncatalytic and catalytic runs of NMBB, respectively, at 350, 375, 400, 425 and 450° C. using a small amount of n-tridecane solvent (1.48 g). Without ATTM, the conversions of NMBB were negligible at 350–375° C., low but observable at 400–425° C. Only when temperature is increased to 450° C., noncatalytic conversion becomes significant, reaching 67.5%. When ATTM was used as a catalyst precursor, both C—C bond cleavage and hydrogenation were promoted, and NMBB conversions are over 70% in all the catalytic runs. As shown in FIG. 10, adding water to the runs with ATTM substantially enhanced the catalytic reaction: NMBB conversions increased from 78.9 to 99.3% for runs at 350° C. The promoting effect of water is still apparent for runs at 375–400° C., but the net increase in conversion becomes smaller because the NMBB conversions are already over 92% with ATTM without added water. It is clear from these results that the use of ATTM with added water is more effective than ATTM alone for NMBB conversion, particularly at lower temperatures.

Both types of catalytic runs (ATTM, and ATTM+H$_2$O) show similar patterns of product distributions. For the run with ATTM and ATTM+H$_2$O, naphthalene and 4-methylbibenzyl are the major products, indicating that both catalysts effectively promote the cleavage of aromaticaliphatic C—C bond a in NMBB. However for noncatalytic run at 425° C. toluene and 1-(p-tolylmethyl)naphthalene, abbreviated as TMN, are the major products. This indicates that the cleavage of band d in NMBB occurs predominantly in noncatalytic runs at higher temperatures. The weakest bond in NMBB is bond d. The cleavage of the bond d in NMBB seems to occur predominantly under thermal reaction conditions over 400° C. For the run with Mo sulfide catalyst only catalyst-mediated reactions occur below 375° C., but at over 400° C. both catalytic and thermal reactions occur. Disappearance of TMN in the products at 425° C. seems to be due to secondary reaction of TMN or quick decomposition of NMBB in early stage of catalytic reaction. It is clear that the reaction pathways in catalytic and non-catalytic runs are different.

Figure 11:
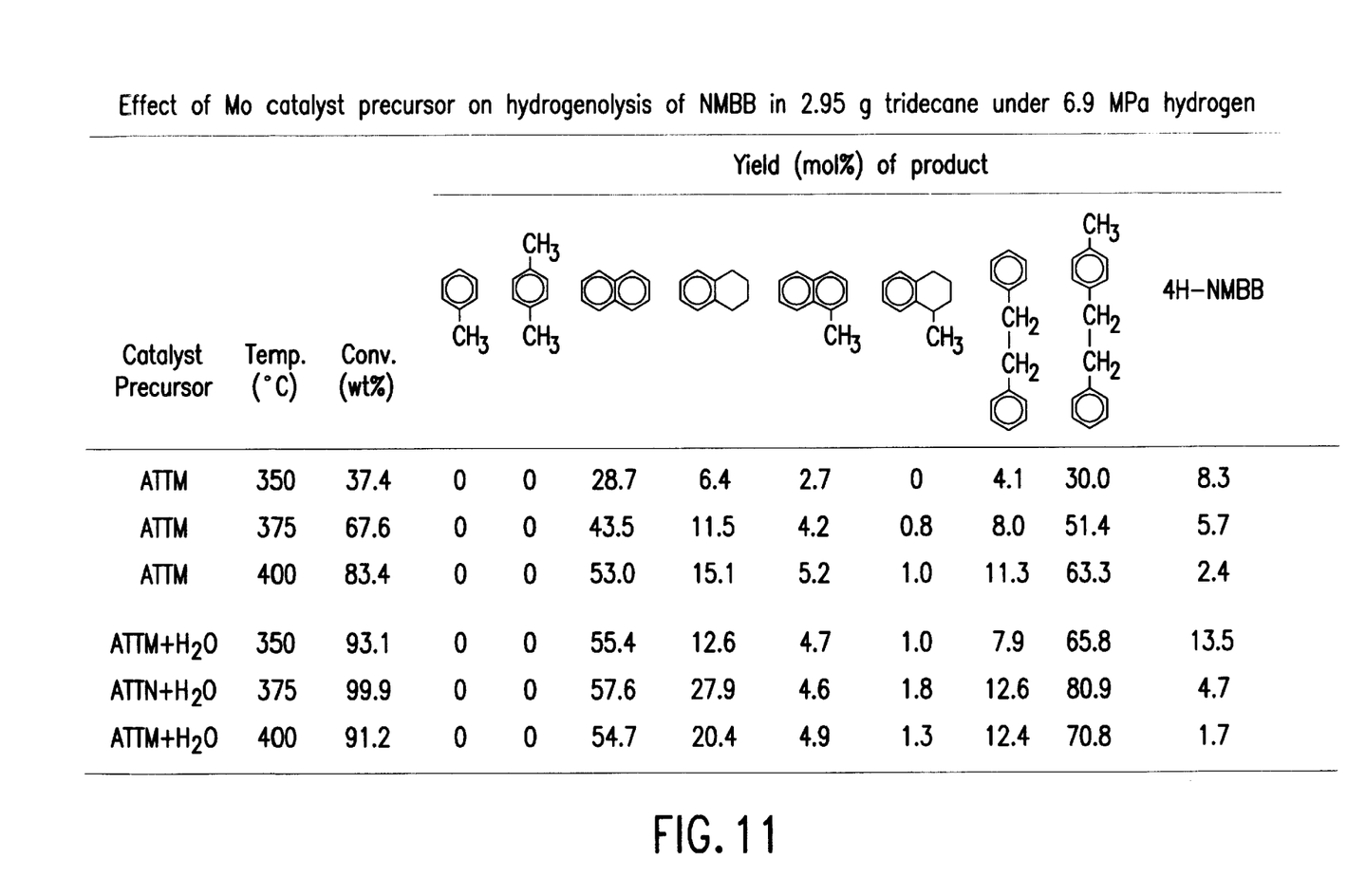
FIG. 11 is a table of the results of effect of Mo catalyst precursor on hydrogenolysis of NMBB in 2.95 g tridecane under 6.9 MPa hydrogen.
Figure 12:
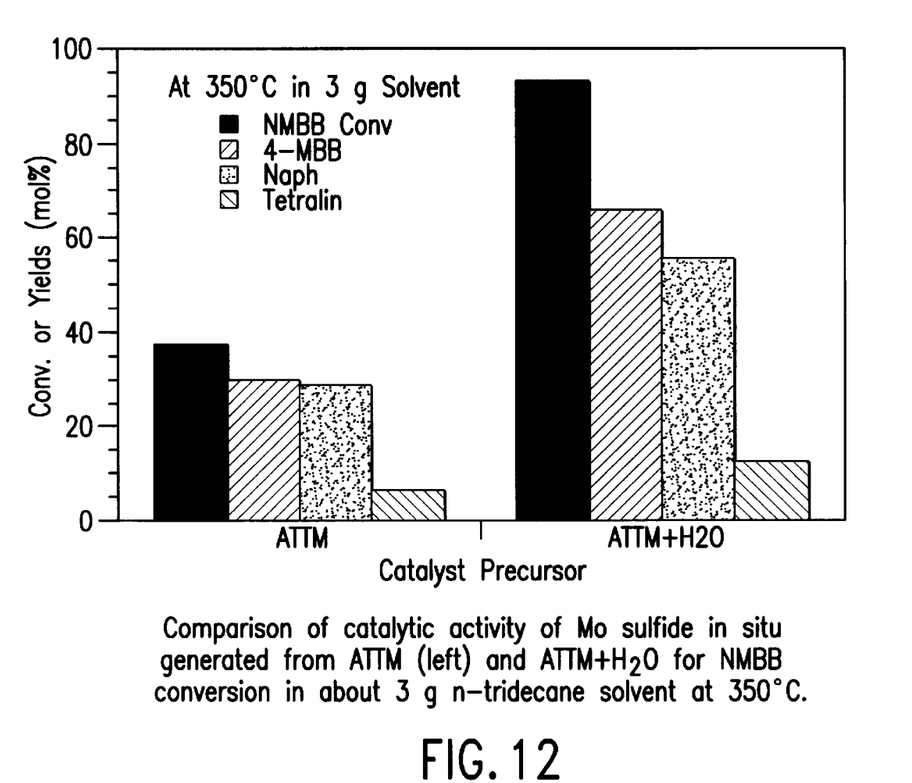
FIG. 12 is a comparison of catalytic activity of Mo sulfide in situ generated from ATTM (left) and ATTM+H$_2$O for NMBB conversion in about 3 g n-tridecane solvent at 350° C.
Figure 13:
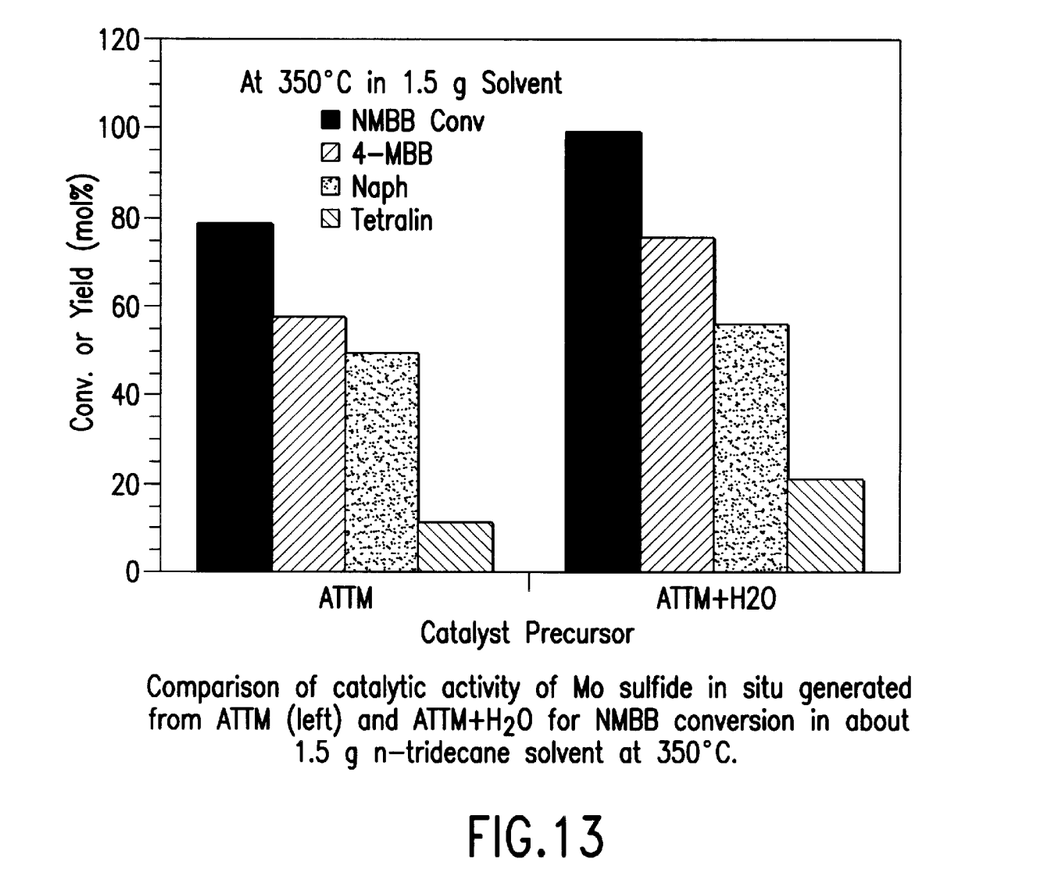
FIG. 13 is a comparison of catalytic activity of Mo sulfide in situ generated from ATTM (left) and ATTM+H$_2$O for NMBB conversion in about 1.5 g n-tridecane solvent at 350° C.

The difference in NMBB conversion between the two types of catalytic runs is large at 350° C. using 1.48 g of n-tridecane, about 20%; however the difference becomes smaller at 375–425° C. because the conversions are very high. In order to further clarify the difference in activity between the catalysts prepared from ATTM and ATTM+$H_2O$, NMBB reaction was conducted using larger amount of n-tridecane solvent (2.95 g). FIG. 11 summarizes the results. FIGS. 12 and 13 compare the performance of the in-situ generated catalysts for the NMBB reaction at 350° C. in the presence of 2.95 g and 1.48 g oft solvent, respectively. NMBB conversions at 350–425° C. with the catalyst in-situ generated from ATTM+$H_2O$ are still high, ranging from 91.2 to 99.9%. These values are similar to the corresponding data in FIG. 10 with smaller amount of solvent. However, NMBB conversions with the catalyst from ATTM alone at 350–425° C. dropped significantly when n-tridecane solvent was increased from 1.48 to 2.95 g. For example, the conversions with ATTM alone decreased from 78.9 to 37.4% at 350° C., and from 92.4 to 67.6% at 375° C. These results suggest that the Mo sulfide catalysts in-situ generated from ATTM+$H_2O$ are substantially more active than those from ATTM alone. Moreover, the Mo sulfide catalysts in-situ generated from ATTM+$H_2O$ are highly effective for the cleavage of C—C bond a in NMBB even when its concentration is relatively low. With respect to the effect of temperature for catalyst preparation, the catalyst prepared from ATTM+$H_2O$ at 375° C. is generally more active than those prepared at 350 and 400° C.

An issue that remains unclear from the one-step test is the role of water addition in catalytic conversion of NMBB. Does water promote the catalytic reaction, or does water addition result in highly active catalyst? To clarify the role of water and the activity of the catalyst from ATTM+$H_2O$, the two-step test was conducted. In the first step, the ATTM precursor was first decomposed in the presence of 2.95 g of n-tridecane with added water under $H_2$ pressure at 350, 375 and 400° C., respectively. In the second step, the water vapor and the $NH_3$ and $H_2S$ gases generated from ATTM decomposition under $H_2$ pressure were removed from the reactor by hot venting at 200° C., and then NMBB was charged into the reactor and reaction was conducted at 350° C. for 30 min.

Figure 14:
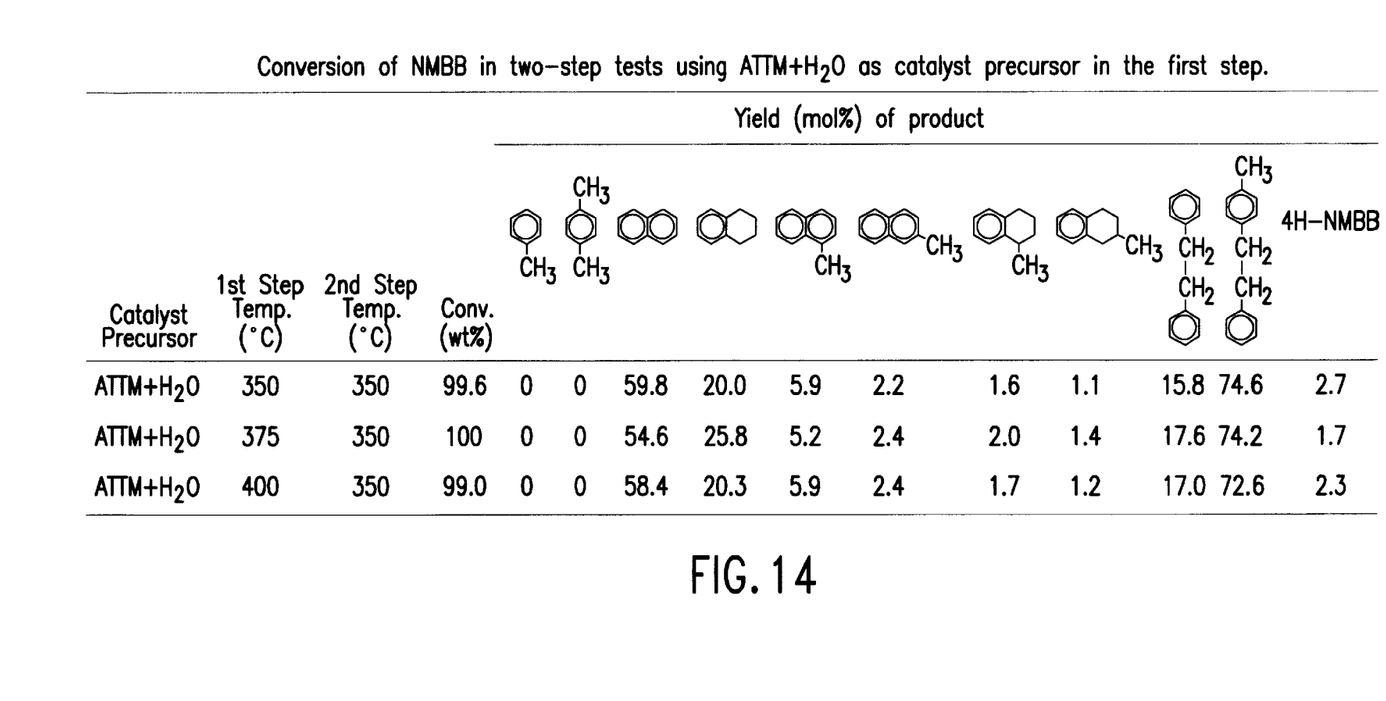
FIG. 14 is a table of conversion of NMBB in two-step tests using ATTM+H$_2$O as catalyst precursor in the first step.

FIG. 14 shows the result of two-step tests of NMBB. The conversions of NMBB from the two-step tests are considerably higher than those of one-step tests at 350° C. As can he seen from comparison of FIG. 14 with FIG. 10, the conversion increased from 93.1% in the one-step tests to 99% in the two-step test. After the removal of water, the catalyst became more active. In the work on dinaphthyl ether (DNE), it was found that the catalysts generated from ATTM+$H_2O$ in the one-step tests are highly active for C—O bond cleavage. The two-step tests indicated that added water is effective for generating highly active catalyst, but when the active catalyst has been generated, the $H_2O$ addition itself has an inhibiting effect on catalytic conversion of DNE. In other words, water itself does not promote catalytic or noncatalytic conversion of DNE. These results indicate that water addition is effective for generation of active Mo sulfide from ATTM; but when the active catalyst has been generated, the water has an inhibiting effect on the C—O bond cleavage or hydrogenation of aromatic ring in DNE reaction.

In addition, as mentioned above the catalyst prepared from ATTM+$H_2O$ at 375° C. is generally more active than those prepared at 350 and 400° C. in the onestep tests. In the two-step tests, NMBB conversions with all the catalysts prepared at 350, 375 and 400° C. are almost 100%. However, the yield of the major hydrogenation product, tetralin, is the highest with the catalyst generated from ATTM+$H_2O$ at 375° C., as shown in FIG. 14.

The chemical analysis of the catalysts from ATTM alone and ATTM+$H_2O$ gives S-to-Mo atomic ratios of 2.03–2.04, identical to that of the commercially available $MoS_2$ reagent. Therefore, the Mo sulfide samples from both ATTM and ATTM+$H_2O$ have very similar chemical composition, but differ in morphology such as particle shape (SEM), surface area (BET) and degree of layer stacking ot MoS2 slab (XRD).

Mo sulfide catalysts generated from ATTM in the presence of n-tridecane solvent with added $H_2O$ under $H_2$ pressure at 350–400° C. are much more active than those from ATTM alone for cleavage of C—C bond a and hydrogenation of naphthalene ring in NMBB. Addition of water to ATTM can more than double the conversion of NMBB in the presence of a larger amount of n-tridecane solvent at 350° C. Water addition is effective for generation of highly active catalyst, but water itself does not promote catalytic conversion of NMBB. Removal of water after ATTM decomposition at 350–400° C. under $H_2$ pressure gives a highly active Mo sulfide catalyst.

We claim:

1. A method of preparing a Mo Sulfide catalyst comprising decomposing ammonium tetrathiomolybdate in an organic solvent with added water under $H_2$ pressure in a reactor, wherein the decomposing of the ammonium tetrathiomolybdate is performed under heat.

2. The method of claim 1, wherein said organic solvent is tridecane.

3. The method of claim 1, wherein said decomposing is performed in a reactor.

4. The method of claim 1, wherein said decomposing is performed at a temperature range between 300 and 500° C.

5. The method of claim 1, wherein the reactor is an autoclave.

6. The method of claim 1, wherein the reactor and its contents are quickly cooled by quenching in a cold water bath.

7. The method of claim 1, wherein the water is removed from the decomposed ammonium tetrathiomolybdate.

8. The method of claim 7, wherein the water is removed by hot venting of water vapor.

9. The method of claim 7, wherein the water is removed by filtration of the water from the decomposed ammonium tetrathiomolybdate.

* * * * *